May 27, 1947. W. H. DE LANCEY 2,421,318
FLUID PRESSURE MOTOR OF THE EXPANSIBLE CHAMBER TYPE
WITH PISTON OPERATED SNAP ACTION VALVE
Filed Oct. 30, 1944 2 Sheets-Sheet 1
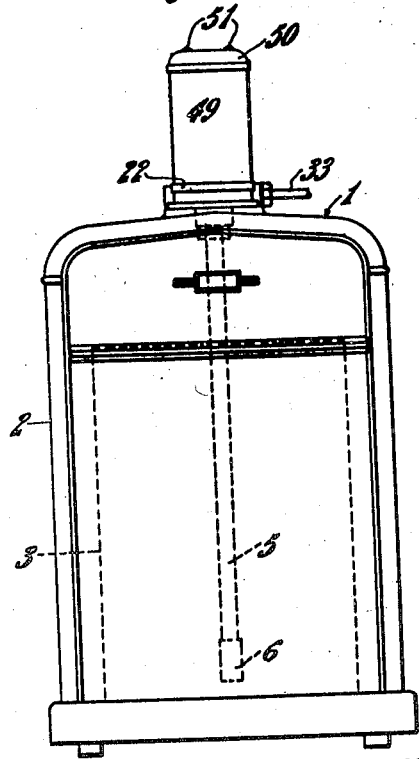
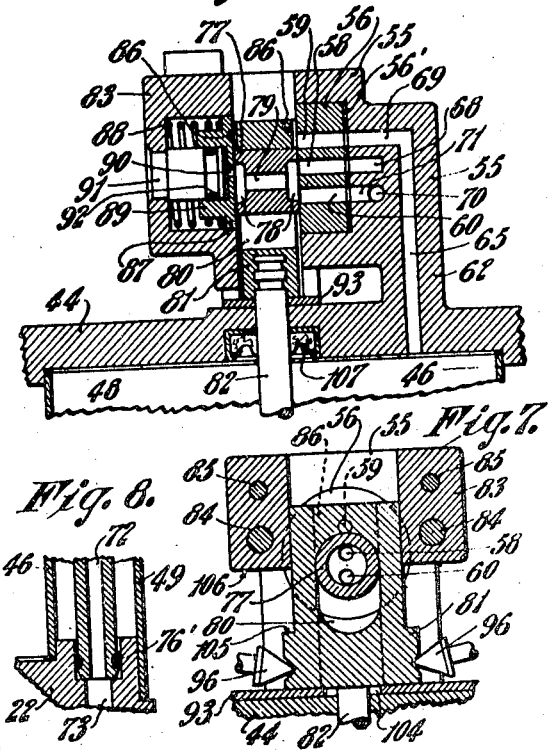
INVENTOR.
Warren H. DeLancey,
BY Chaplin & Neal
ATTORNEYS

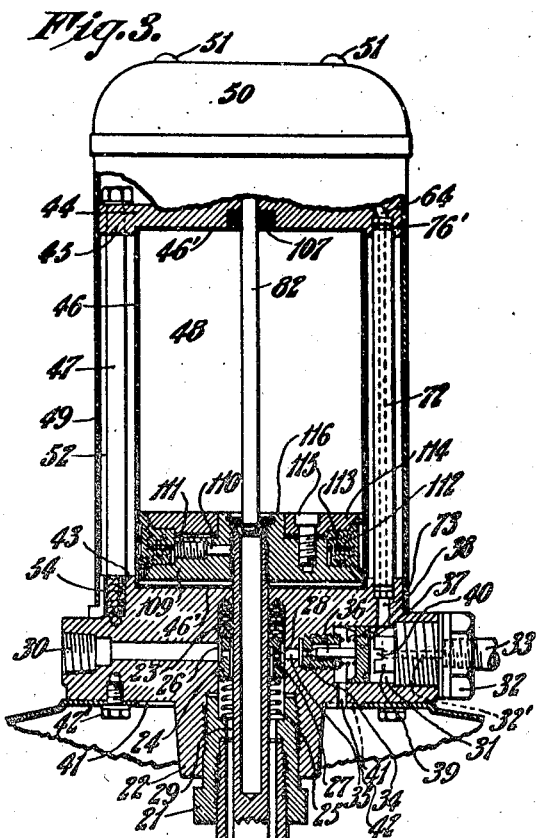

Patented May 27, 1947

2,421,318

UNITED STATES PATENT OFFICE 2,421,318

FLUID PRESSURE MOTOR OF THE EXPANSIBLE CHAMBER TYPE WITH PISTON OPERATED SNAP ACTION VALVE

Warren H. De Lancey, Springfield, Mass., assignor to Gilbert & Barker Manufacturing Company, West Springfield, Mass., a corporation of Massachusetts Application October 30, 1944, Serial No. 560,924

5 Claims. (Cl. 121—164)

This invention relates to improvements in motors of the reciprocating-piston type adapted to be actuated by fluid under pressure.

The invention has for one object to provide in a motor of the class described, a valve mechanism including a slide valve and means including toggle links and springs, for moving the valve with a snap action from one to the other of its two extreme positions, together with a valve actuator, movable by the piston of the motor and adapted to move the toggle links from either extreme position to and across mid position—the springs then completing the movement of the links and the actuator—characterized in that said actuator can be positively moved by the motor piston throughout its entire stroke if and when said springs and toggle links fail for any reason to move the actuator.

The invention has for another object the provision in a motor of the class described, of improved valve mechanism including a reciprocable valve actuator, movable by the motor piston from either extreme position to and slightly beyond mid position and movable the balance of the way by springs associated with toggle links and acting on opposite sides of the actuator, and fulcrum means for said means bodily movable laterally of the line of movement of the actuator to automatically equalize the pressure on opposite sides of the actuator.

The invention has for another object to provide in a motor of the class described, valve mechanism for controlling the supply of pressure fluid to said cylinder and including a slide valve and a spring-pressed pressure plate for holding the valve against its seat, and passages and recesses in said valve and pressure plate for enabling the pressure fluid to act equally and in opposite directions on both the valve and the pressure plate, whereby the valve is held to its seat solely by the pressure of the pressure-plate spring unaffected by variations in the pressure of the actuating fluid.

The invention has for another object to provide in a motor of the class described an improved mounting and arrangement of parts, whereby the valve mechanism is located entirely on one head and encased in a cap which cooperates with said one head to form a housing.

The invention has for a further object to provide an improved mounting for the pressure fluid conduits which lead from one cylinder head to the other for conducting pressure fluid to the valve mechanism and/or conducting pressure fluid to or discharging it from that end of the motor cylinder opposite to the end where the valve mechanism is located.

A further object of the invention is to provide an improved housing for the motor cylinder, said conduits and valve mechanism.

A further object of the invention is to provide in a motor of the class described, valve mechanism of generally simplified and improved mechanical structure.

A further object of the invention is to provide in a motor of the class described, generally simplified and improved mechanical structure.

The invention will be disclosed with reference to the accompany drawings, in which—

Fig. 1 is a small-scale exterior elevational view showing the motor of this invention mounted on a wheeled cabinet containing a grease drum and adapted to actuate a grease pump for dispensing grease from the drum;

Fig. 2 is a plan view of the motor;

Figs. 3 and 4 are sectional elevational views taken on the lines 3—3 and 4—4, respectively of Fig. 2; and Figs. 5, 6 and 7 are fragmentary sectional views taken on the lines 5—5, 6—6, and 7—7, respectively of Fig. 2;

Fig. 8 is a fragmentary sectional view illustrative of the mounting of the air-conducting tubes; and Fig. 9 is a fragmentary sectional elevational view illustrative of an operating connection between the rod of the valve actuator and the piston rod.

Referring to these drawings; the grease pump and its actuating motor are shown in Fig. 1 as supported from the top wall 1 of a wheeled cabinet 2, adapted to contain a grease drum 3, the cover of which has been removed. The arrangement is such that the grease pump is located in drum 3, near the bottom thereof and submerged in the grease, while the motor is exposed outside the cabinet.

The grease pump (Fig. 3) consists of a cylinder 4 within a barrel 5, having threaded on its lower end a casing 7, containing a foot valve 6, cooperating with a seat in the casing. Slidable in cylinder 4 is a piston including a plurality of packing rings 8 of substantially V-shape cross sectional form, mounted in a stack on a portion 9 of a piston rod 10. A spreader ring 11, slidably mounted on the portion 9 engages the uppermost ring 8 and a nut 12, threaded on the lower end of the piston rod has a groove to engage and fit the lower ring 8. Nut 12 clamps the rings between it and the spreader 11 and the latter against a shoulder on the piston rod. The piston rod has a diametrical hole 13 therethrough, located above the piston, and an axial passage 14 extending from hole 13 downwardly to the lower end of the piston rod and communicating with an axial passage 15 in a nut 12. The lower end of the latter is threaded into the upper end of a hollow cylindrical valve cage 16, having in its lower end a seat with which a ball valve 17 is engaged. A spring 18 acting between valve 17 and a seat 19 on the extreme lower end of nut 12 tends to hold valve 17 on its seat. The seat 19 has a hole 20 extending diametrically therethrough and communicating with the lower end of passage 15.

The upper end of the barrel 5 is threaded into an adapter 21 and the latter is threaded into a central opening in the lower wall of the base 22 of the air motor which base rests upon the wall 1. The piston rod extends through this base and through a stuffing box mounted in the base and including a stack of packing rings 23 of substantially V-shaped cross section, a gland 24 and a spring 25, which acts against a seat in adapter 21 and presses the gland 24 upwardly to compress the packing rings 23. The gland 24 has in its external periphery and intermediate its ends a circumferential groove 26 which is connected by one or more radial passages 27 to a counterbore 28 in the gland. This counterbore provides an annular passage communicating through an annular passage 29 in the adapter with the upper end of the grease pump cylinder 4. A grease outlet passage 30 is provided in base 22 having one end in communication with groove 26 and the other threaded to receive the usual grease-dispensing hose (not shown).

The operation of the grease pump is the usual one. On an upstroke of the grease piston, valve 17 is closed and a suction is created in the lower end of cylinder 4, raising foot valve 6 and allowing grease to enter the cylinder 4 below the piston. On a downstroke of the piston, valve 6 closes and valve 17 opens, allowing grease to pass through the piston to the upper side thereof, to be lifted on a succeeding upstroke of the piston and expelled by way of passages 29, 28, 27, 26 and 30 to the dispensing hose with its usual valve controlled nozzle (not shown).

The fluid pressure, such as compressed air for example, which is used for actuating the air motor enters a cylinder 31 formed in base 22 at a point diametrically opposite from the grease outlet passage 30. The outer end of cylinder 31 is closed by a nut 32, except for an axial passage 32' therein which communicates with the pressure fluid supply pipe 33, fixed to said nut. The inner end of cylinder 31 is bored out and threaded to receive a valve seat member 34, the opening in which is connected by a passage 35 to the groove 26. A valve 36 cooperates with the seat to open or close the passage 35, accordingly as the supply of pressure fluid to cylinder 31 is turned off or on, respectively. A piston 37, slidable in cylinder 31, is fixed to valve 36 and is movable by the pressure fluid to close the valve. A spring 38, acting between the valve seat member 34 and piston 37 acts to open the valve, when the pressure fluid is not available at the requisite pressure in cylinder 31. The inner end of nut 32 forms a stop 39 to limit the outward movement of the piston 37 and is turned down to provide an annular space between it and the cylinder. In the inner end of this stop 39 are crossing diametrical slots 40 which afford communication between air inlet passage 32' and said annular space when the piston engages the stop. A radial outlet passage 42 is provided through the peripheral wall of the cylinder 31 near its inner end and opening through the bottom wall of base 22 in overlying relation with the open upper end of grease drum 3. Whenever the air supply to the actuating motor is shut off, the grease outlet, and particularly the dispensing hose, is automatically vented through passage 42—any grease expelled falling into drum 3.

The base 22 has on its lower face a plurality of radial ribs 41 to enter the opening in the wall 1—the shoulders formed at the outer ends of these ribs engaging the wall of such opening and serving to properly center the grease pump relatively thereto. The base is held in place by a plurality of cap screws 42' which pass through wall 1 and thread into the base.

The top of base 22 has an annular wall 43 having finished internal and external cylindrical surfaces. A cylinder head 44 has an annular wall 45 with finished internal and external surfaces of the same diameter as the respective internal and external surfaces on the head-forming top portion of base 22. A shell 46, such as a length of metal tubing, fits into the confronting cylindrical recesses in the opposed heads 22 and 44, engaging the internal peripheral walls of each and having its ends resting against gaskets 46'. A plurality of tie bolts 47, pass through wall 45 of head 44 and thread into holes in wall 43 of head 22, thereby clamping the ends of the shell against the gaskets 46' and the latter against the upper and lower cylinder heads. The cylinder of the air motor, formed within shell 46 and heads 22 and 44 is designated 48.

The external peripheral surfaces of walls 43 and 45 engage the internal peripheral wall of a shell 49, which is made of metal tubing and which at its lower end seats on base 22. The upper end of shell 49 extends above the head 44 and is closed by a pressed metal cap 50, held in place by screws 51 as will later appear. The upper portion of shell 49 and its cap 50 serve to enclose all of the valve mechanism which is mounted on top of the upper head 44. The annular space 52 between the shells 46 and 49 is connected to the enclosed space above head 44 by a hole 53 (Fig. 2) in such head and is used as an exhaust passage. This passage is connected to the atmosphere by a large notch 54 in the external periphery of wall 43 (Fig. 3).

The upper cylinder head 44 has upstanding therefrom a bracket 55 (Figs. 2 and 6) which has in one vertical face thereof a cylindrical recess to receive a cylindrical valve seat member 56 made of suitable hard material, such for example as "Nitralloy." This seat is clamped to the support with a gasket 56' therebetween by three cap screws 57 passing horizontally through the bracket 55 and having their inner ends threaded into holes in seat 56, which holes however do not pass entirely through the seat. This seat (Figs. 6 and 7) has extending therethrough a central passage 58 and upper and lower passages 59 and 60, respectively. The axes of all these passages are located in the same vertical plane. The bracket 55 is supported by a web 55' having three tubular portions 61, 62 and 63, containing passages 64, 65 and 66, respectively. The passage 64 at its lower end is connected to the air supply as will later appear. The upper end of passage 64 (Fig. 4) communicates with the outer end of a horizontal passage 67 in web 55' and the inner end of passage 67 communicates with one end of a passage 68, the other end of which communicates with the central passage 58 in the valve seat as shown in Fig. 6. The passage 65 at its lower end communicates with the upper end of cylinder 48 and its upper end communicates with a passage 69 leading to the upper passage 59 in the valve seat. The passage 66 (Fig. 4) at its lower end communicates with the lower end of cylinder 48, as will later be described in detail. The upper end of passage 66 communicates with the outer end of a horizontal passage 70, formed in web 55' and the inner end of passage 70 is connected to a passage 71 leading to the lower passage 60 in the valve seat, as shown in Fig. 6.

The air supply passage 64 (Fig. 4) is connected by a tube 72 to a passage 73 in base 22 and such passage opens into the outer end of cylinder 31 to which the compressed air supply pipe 33 is connected as already described. The passage 66 is connected by a similar tube 74 to a short vertical passage 75 in the base 22. From the lower end of passage 75, a passage 76 extends in upwardly diverging relation, opening into the lower end of cylinder 48. Each tube has its ends engaged in confronting recesses in the two cylinder heads. Each end of each tube has thereon a suitable packing ring, such as the O-ring 76' of rubber or the like, herein shown. Such ring (Fig. 8) is forced over the tapered extremity of the tube and into a circumferential groove in the tube. The O-ring 76' is compressed between the tube and the peripheral wall of the tube-receiving recess and provides an air tight joint. The ends of each tube do not necessarily have to be clamped against the end walls of the two confronting tube-receiving recesses in the cylinder heads.

The valve for the air motor consists of a cylindrical piece 77 (Figs. 2 and 7) of suitable material, preferably carbon, which will slide on its hardened seat 56 with very little friction and which is self lubricating. This valve (Fig. 6) has a coaxial cylindrical recess 78 in each end face and a coaxial passage 79 which interconnects these recesses.

The valve 77 (Figs. 6 and 7) is mounted in an elongated slot 80 in a yoke 81 with freedom to slide as well as turn therein. The ends of slot 80 are semi-cylindrical and of substantially the same radius as the valve. The yoke 81 may be a die casting and its actuating rod 82 may be fixed thereto during the die casting operation. The yoke is vertically slidable in a slot formed in the inner face of a guide member 83 which is fastened by cap screws 84 (Fig. 5) to the bracket 55 and is located with close accuracy relatively thereto by dowel pins 85. The valve yoke is adapted to move valve 77 from a position in which one of its end recesses 78 will interconnect the upper and central passages 59 and 58, respectively, to a position in which the same recess interconnects the central and lower passages 58 and 60, respectively. When the valve is in the first position, the lower passage 60 is wholly uncovered by and lies beyond the outer periphery of the valve and in communication with one of two slots 86 in opposite side faces of yoke 81, whereby the upper end of the motor cylinder 48 can exhaust into the space within cap 50 and by the passages 53, 52 and 54 to the atmosphere. When the valve is in the second position, the upper passage 59 is wholly uncovered by, and lies beyond the outer periphery of, the valve, whereby the lower end of the cylinder 48 is connected in a similar manner to exhaust to the atmosphere.

The valve guide member 83 (Figs. 2 and 6) has a cylindrical recess opening into the yoke-receiving slot therein. In this recess is mounted a pressure plate 87 the diameter of which is just slightly less than the width of the yoke 81. A spring 88 encompassing a hollow hub 89 on the pressure plate and acting against the end wall of the recess in the valve guide 83 forces the valve 77 against the valve seat 56. The axial dimension of this valve is slightly greater than the thickness of the yoke 81 so that the valve will be held against its seat while the yoke will be free to slide up and down relatively to the valve. This pressure plate has an axial opening 90 therethrough. A stud 91 fixed to the end wall of said recess in the guide member 83 extends into the hollow hub 89 and carries a suitable packing, such as an O-ring 92 of rubber or the like to prevent leakage from the hub.

The axial passage 79 in valve 77 allows pressure fluid to pass from one recess 78 to the other and thus balance the pressures acting on opposite sides of the valve. So also, the hole 90 in the pressure plate allows the pressure fluid to pass into the hollow hub and enable the pressures acting on opposite sides of this plate to be approximately balanced. In this way, substantially all of the pressure which holds valve 77 to its seat, is that supplied by spring 88. The pressure due to this spring, having once been properly determined, can be maintained constant thereafter without being affected by variations in the pressure of the air or other pressure fluid used to actuate the motor.

The valve yoke is held in each two extreme positions by spring-actuated toggle links, best shown in Fig. 5. Mounted on the upper face of head 44 with its central portion directly underlying the valve yoke is a plate 93 which projects beyond opposite sides of the valve yoke and has upstanding arms 94 one on each end thereof. These arms 94 are provided on their confronting faces with V-shaped grooves. The valve yoke 81 has in opposite side faces similar grooves. A pair of toggle links 95 are provided, one on each side of the valve yoke, and each interconnects an arm 94 to the yoke. Each toggle link has fixed to its inner end a knife edge 96 which is engaged in a V-shaped groove in the valve yoke. On each link, adjacent the part 96 is a washer 97. A spring 98 is placed on each link 95, followed by a washer 99, and a knife edge 100. The upper end of each arm 94 (Fig. 2) has a central notch therein to receive the outer end of the toggle link and permit it to slide back and forth relatively thereto. The knife edge 100 (Fig. 5), which is slidable on link 95, fits into the V-shaped groove in an arm 94 and provides a fulcrum for the link. The plate 93 is free to slide, within limits, laterally of the valve yoke 81 in order to equalize the pressure of the springs 98 on the yoke and avoid any side thrust thereon. The head 44 has two upstanding studs 101 which pass through slots 102 in the bracket and have their upper ends spun over against a washer 103. A central slot 104 is provided in the bracket through which the rod 82 passes. The construction enables the bracket to move to the right or left of the valve yoke 81 to a sufficient extent to balance the pressure of the springs 98 on the valve yoke. As a consequence of the arrangement very strong springs may be used. The bottom of the valve yoke abuts plate 93 as a stop to limit its downward movement. The yoke has shoulders 105 (Fig. 7), one on each side thereof, to abut the surfaces 106 of the guide 83 as a stop to limit the upward movement of the valve yoke. When the yoke is in its lowermost position the valve 77 is in its lowermost position and air under pressure will be admitted to the lower end of cylinder 48 and exhausted from its upper end. When the valve yoke is in its uppermost position, the valve 77 is also in its uppermost position and air under pressure will be admitted to the upper end of cylinder 48 and exhausted from the lower end thereof.

The valve rod 82 (Fig. 3) extends downwardly through head 44 and a suitable sealing device 107 therein and enters a long and axially-directed hole 108 formed in the upper end of the piston rod 10. The power piston comprises a body 109 threaded on the upper end of rod 10 and fixed in position by a plug 110, forced against rod 10, by a screw 111, threaded in the upstanding cylindrical hub portion of body 109. A packing 112, having centrally thereof a stiffening ring 113, is clamped between the flange portion of the body 109 and a plate 114 by a series of cap screws 115, which pass through the plate and thread into the body 109. The plate 114 fits over a central hub 116 on the piston body 109 in order to bring the two packing-compressing flanges into coaxial relation. The valve rod 82 is actuated by the piston near the end of each stroke. To this end, the valve rod carries a snap ring 117 (Fig. 9), set into a circumferential groove in the rod near its lower end. This ring 117 is a simple and convenient means of providing a flange on the valve rod. Set into a central recess in the upper end of the hub 116 and held in place by a snap ring 118 or any other suitable means is a washer 119 through which rod 82 slides. When the piston moves downwardly, the washer 119 will, near the end of the piston's stroke, engage ring 117 and move rod 82 downwardly into the illustrated position. When the piston moves upwardly, the bottom of hole 108 will, near the upper end of the piston's stroke engage the lower end of valve rod 82 and lift it far enough to carry the valve from its lower to its upper position, as will be clear from Fig. 3.

The screws 51, above described as holding cap 50 in place, thread one into the upper end of a post 120 (Figs. 2 and 5) upstanding from valve seat bracket 55 and the other into the upper end of a similar post 121 upstanding from the guide member 83 for the valve yoke.

The operation of the motor will next be described. Assuming that the parts occupy the positions shown in Fig. 3 and that the supply of compressed air to pipe 33 is turned on, the valve 77 is so positioned as to interconnect the passages 58 and 60. Air under pressure from pipe 33 enters through passage 32', cylinder 31, passage 73, tube 72, passages 64, 67 and 68 (Fig. 4) to passage 58 (Fig. 6) and through valve recess 78 into passage 60 and thence by passages 71, 70, 66 (Fig. 4), tube 74, and passages 75 and 76 into the lower end of cylinder 48. The piston will thus be moved upwardly. As the piston moves upwardly, the upper end of the cylinder is free to exhaust by way of passages 65, 69 and 59 (Fig. 6), and one of the slots 86 in the valve yoke 81 into the interior of cap 50 and thence through hole 53 (Fig. 2), space 52 (Fig. 3) and slot 54 to the atmosphere. As the piston nears the upper end of its stroke, the bottom wall of hole 108 in piston rod 10 will engage the bottom of valve rod 82 and lift the latter. The valve yoke 81 will slide upwardly in its guide 83 without moving valve 77 (Figs. 6 and 7)—the latter being held in position by the pressure applied thereto by the plate 87 and spring 88 (Fig. 6). The inner ends of the toggle links 95 (Fig. 5) will be raised by the yoke 81 until they cross the horizontal plane in which the fulcrums on arms 94 are located. Then, the springs 98 will expand and force the valve yoke rapidly upwardly, pulling rod 82 upwardly away from its former actuating member—the bottom of hole 108—and moving valve 77 into its upper position. A rapid and substantially instantaneous reversal of the valve is thus effected. However, it is important to note that should the toggle springs 98 fail for any reason to move valve 77, the latter will be positively moved, although more slowly, by the motor piston. At the time that the springs 98 are about to move the yoke upwardly the bottom wall of slot 80 (Figs. 5 and 7) will have engaged the lower half of the periphery of valve 77 and the latter can be moved to its upper position positively by rod 82 and piston rod 10.

The reversal of valve 77 causes the passages 58 and 59 in the valve seat to be connected by the recess 78 in the valve. Accordingly, air under pressure, entering as before described into passage 58, passes out through passages 59, 69 and 65 (Fig. 6) into the upper end of cylinder 48. The piston will thus be moved downwardly. The lower end of cylinder 48 is free to exhaust as the piston moved downwardly since the passage 60 is uncovered by valve 77. Air can pass from the lower end of the cylinder (Fig. 4) by way of passages 76 and 75, tube 74, passages 66, 70 and 71, and slots 86 (Fig. 6) in the valve yoke 81 into the interior of cap 50, whence it escapes to the atmosphere as before described. As the piston nears the lower end of its stroke, the washer 119 on the piston engages the snap ring 117 on the valve rod 82 and pulls the latter and valve yoke 81 downwardly. The first result is to swing the inner ends of the toggle links 95 downwardly until they cross the horizontal plane which interconnects the fulcrums on arms 94. Then, the springs 98 expand and rapidly drive the valve yoke downwardly until it abuts plate 93, thereby moving valve 77 substantially instantaneously from its upper to its lower position. If the springs 98 fail for any reason to thus move the valve, the latter will be positively moved because the upper wall of slot 80 in the yoke 81 will engage the upper half of the periphery of the valve 77 and pull it into its lower position.

The reversal of valve 77 will cause air to be admitted to the lower end of cylinder 48 to move the piston upwardly and air to be exhausted from the upper end of the cylinder by upward movement of the piston. The described operation will be repeated as long as the air supply is turned on. If the valve in the grease dispensing nozzle is closed the air supply is not turned off, the motor will stall. The valve 36 will not open under such condition but if expansion of the grease should occur as in the hose for example, the valve 36 will open to relieve the excess pressure and such grease as passes the valve will flow through passage 42 as a by-pass into the grease drum 3.

The invention provides a generally improved reversing valve mechanism for a fluid-pressure-operated motor of the reciprocating piston type. A quick, snap action of the valve is secured by relatively simple construction which is calculated to be substantially fool proof in operation and to give a long life of useful service. The valve action is proof against spring failure because it can be moved positively by the valve rod if and when necessary. The valve parts are constructed of materials which are relatively slidable with a low coefficient of friction. The sliding valve is self-lubricating. The air pressure on it is balanced. And the toggle link springs have their pressure on the slidable valve yoke equalized. These factors tend to reduce wear, prolong life and do away with the necessity for frequent servicing. The construction is efficient in operation and also lends itself to manufacture in quantities at low unit cost.

What I claim is:

1. A motor comprising, a cylinder including two heads, a shell between the heads and tie bolts for drawing the heads together against the ends of the shell, said heads having in their confronting faces a plurality of cylindrical recesses each extending part way into but not through its head, said recesses disposed in pairs with the recesses of each pair disposed on opposite heads and in coaxial relation, tubes one for each said pair, each tube having its ends seated one in each recess of a pair, a packing ring on each end of the tube for engaging the peripheral wall of its recess, valve mechanism on one head for controlling the admission and discharge of pressure fluid to and from each end of said cylinder, a supply conduit for the pressure fluid connected to the other head and communicating with one recess and one end of one tube, the first-named head having a conduit extending from the opposed recess and the other end of the last-named tube to said mechanism and from the latter to a recess and one end of the other tube, the second-named head having a conduit extending from the opposed recess and the other end of the second-named tube into one end of said cylinder, the first-named head having a conduit from said mechanism through the head and into the opposite end of the cylinder.

2. A motor, comprising, a base having thereon a cylinder head with inner and outer coaxially-disposed cylindrical surfaces, a second cylinder head having matching inner and outer coaxially-disposed cylindrical surfaces, a cylinder-forming shell having its ends engaged by the heads and the end portions of its periphery engaged with the two inner cylindrical surfaces, tie bolts for drawing the heads together against the ends of the shell, valve mechanism on the second head for controlling the admission and discharge of pressure fluid to and from each end of the cylinder, a cylindrical shell engaging the outer cylindrical portions and enclosing said cylinder-forming shell and forming therebetween an annular chamber, a cap on the shell forming with the second head a second chamber for housing said valve mechanism, said mechanism including a passage for discharging pressure fluid from each end of the cylinder into the second chamber, the second head having a passage interconnecting both chambers, and an exhaust port for the first chamber adjacent the first head.

3. In a motor, having a cylinder with heads, a piston in said cylinder, and valve mechanism for controlling the admission of pressure fluid to and the discharge of such fluid from the ends of said cylinder; said mechanism including a slide valve and a valve seat therefor fixed to one of said heads, said seat having a supply port for pressure fluid and two cylinder ports one on each side of the supply port in the direction of reciprocation of the valve, means operable by the piston to move said slide valve first in one and then in an opposite direction from one to the other of the extremes of its stroke, said valve having a recess in its seat-engaging face to interconnect the supply port first to one and then to the other of the cylinder ports accordingly as it is at one extreme or the other of its stroke, the valve having in its opposite face an opposed recess of the same configuration and area as the first recess and a passage interconnecting the two recesses, a pressure plate engaging the second-named face of the valve, a spring for pressing the plate against the valve and the latter against its seat, the pressure plate having in the face opposite its valve-engaging face a cylinder having a closed inner end of the same configuration and substantially the same area as each said recess and opposed to such recesses, a fixed piston in said cylinder and closing the outer end thereof, said inner end having a passage therethrough, fluid pressure from the supply port passing into both recesses and into said cylinder to act equally in opposite directions on the valve and on the pressure plate, whereby the valve is held to said plate solely by the pressure of said spring.

4. In a motor, having a cylinder with heads, a piston in the cylinder and valve mechanism controlling the admission of pressure fluid to and the discharge of such fluid from the cylinder; said mechanism including a cylindrical slide valve reciprocable in the same direction as the piston, a seat for said valve, a reciprocable yoke for moving the valve and having an elongated slot therein with semi-cylindrical ends, said valve being located in said slot and free to rotate, means for moving said yoke by the piston near each end of its stroke, said slot having a dimension in the direction of reciprocation of the yoke equal to the length of the valve in said direction plus half the stroke of the yoke, and snap-action means conditioned during the first half of each stroke of the yoke to complete the stroke of the yoke and move the valve from one extreme position to the other.

5. In a motor, having a cylinder with heads and a piston in the cylinder, a valve seat and a plate mounted on one of said heads with their adjacent faces parallel with the axis of the piston, said seat having a supply port for pressure fluid and two ports connected one to one end and the other to the other end of said cylinder, a slide valve mounted between said seat and plate and reciprocable in the same direction as the piston, yieldable means for maintaining the valve in engagement with the plate and seat, said valve having a recess in one face to interconnect the supply port first to one and then to the other of the cylinder ports and having in the other face a communicating recess of substantially the same area so that the fluid pressure on opposite sides of the valve is balanced, a reciprocable yoke slidably mounted on said one head and encompassing said valve, a rod on the yoke, and means movable with the piston for engaging said rod near the end of each stroke and moving it first in one and then in the opposite direction to actuate said valve.

WARREN H. DE LANCEY.

REFERENCES CITED

The following references are of record in the file of this patent:

UNITED STATES PATENTS

| Number | Name | Date |
|---|---|---|
| 2,163,436 | Raymond et al. | June 20, 1939 |
| 2,215,852 | Klein | Sept. 24, 1940 |
| 2,268,898 | Pelouch | Jan. 6, 1942 |
| 2,269,423 | Barks et al. | Jan. 13, 1942 |
| 837,252 | Rose | Nov. 27, 1906 |
| 1,845,176 | Palm | Feb. 16, 1932 |
| 2,057,364 | Bystricky | Oct. 13, 1936 |
| 1,765,921 | Joy | June 24, 1930 |
| 2,314,714 | Kouyoumjian | Mar. 23, 1943 |

FOREIGN PATENTS

| Number | Country | Date |
|---|---|---|
| 63,691 | Sweden | Sept. 13, 1942 |
| 18,865 | Great Britain | Oct. 1893 |
| 576,229 | France | Aug. 13, 1924 |